(12) United States Patent
Kaku (10) Patent No.: US 12,254,585 B2
(45) Date of Patent: Mar. 18, 2025

(54) SYSTEM, INFORMATION PROCESSING APPARATUS, AND METHOD FOR GENERATING MESH DATA FROM TWO-DIMENSIONAL POINT CLOUD DATA

(71) Applicant: TOYOTA JIDOSHA KABUSHIKI KAISHA, Toyota (JP)

(72) Inventor: Wataru Kaku, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 18/168,200

(22) Filed: Feb. 13, 2023

(65) Prior Publication Data

US 2023/0260076 A1    Aug. 17, 2023

(30) Foreign Application Priority Data

Feb. 14, 2022 (JP) ................. 2022-020857

(51) Int. Cl.
| | |
|---|---|
| *G06T 3/00* | (2024.01) |
| *G06T 3/067* | (2024.01) |
| *G06T 3/40* | (2006.01) |
| *G06T 7/50* | (2017.01) |

(Continued)

(52) U.S. Cl.
CPC ............. *G06T 3/067* (2024.01); *G06T 3/40* (2013.01); *G06T 7/50* (2017.01); *G06T 7/70* (2017.01); *G06V 10/761* (2022.01); *G06T 2207/30196* (2013.01)

(58) Field of Classification Search
CPC .. G06T 3/067; G06T 7/50; G06T 7/70; G06T 3/40; G06T 2207/30196
See application file for complete search history.

(56) References Cited

U.S. PATENT DOCUMENTS

| | | | |
|---|---|---|---|
| 2009/0295711 A1 | 12/2009 | Nakamura et al. | |
| 2015/0363665 A1* | 12/2015 | Szasz | H04N 13/204 |
| | | | 382/203 |
| 2017/0316598 A1* | 11/2017 | Wang | G06T 15/04 |

(Continued)

FOREIGN PATENT DOCUMENTS

| | | |
|---|---|---|
| JP | 6-301767 A | 10/1994 |
| JP | 2019-179502 A | 10/2019 |
| WO | 2006/112308 A1 | 10/2006 |

*Primary Examiner* — Terrell M Robinson
(74) *Attorney, Agent, or Firm* — Sughrue Mion, PLLC (57) ABSTRACT

A system includes a first information processing apparatus and a second information processing apparatus capable of communicating with each other. The first information processing apparatus is configured to acquire three-dimensional point cloud data including multiple vertices each having three parameters of x-, y-, and z-coordinates. A combination of the x- and y-coordinates is different from vertex to vertex. The first or second information processing apparatus is configured to convert the three-dimensional point cloud data into two-dimensional point cloud data in which each of the multiple vertices has two parameters of a parameter m with a different value for each combination of the x- and y-coordinates and the z-coordinate. The second information processing apparatus is configured to generate mesh data, using the two-dimensional point cloud data and information indicating correspondence between the combination of the x- and y-coordinates and the parameter m.

7 Claims, 7 Drawing Sheets

(51) Int. Cl.
*G06T 7/70* (2017.01)
*G06V 10/74* (2022.01)

(56) References Cited

U.S. PATENT DOCUMENTS

| | | | | |
|---|---|---|---|---|
| 2019/0139297 A1* | 5/2019 | Chen | ............... | G06T 19/20 |
| 2020/0184651 A1* | 6/2020 | Mukasa | ............... | G06T 7/194 |
| 2021/0209839 A1* | 7/2021 | Hu | ............... | G06T 17/00 |
| 2021/0390789 A1* | 12/2021 | Liu | ............... | G06V 40/161 |

* cited by examiner

<TWO-DIMENSIONAL POINT CLOUD DATA>

VERTEX Pm=(m, zm)

(1≦m≦307200)

<CORRESPONDENCE> m=1⇔x=0, y=0 m=2⇔x=1, y=0

SYSTEM, INFORMATION PROCESSING APPARATUS, AND METHOD FOR GENERATING MESH DATA FROM TWO-DIMENSIONAL POINT CLOUD DATA

CROSS-REFERENCE TO RELATED APPLICATION

This application claims priority to Japanese Patent Application No. 2022-020857 filed on Feb. 14, 2022, the entire contents of which are incorporated herein by reference.

TECHNICAL FIELD

The present disclosure relates to a system, an information processing apparatus, and a method.

BACKGROUND

Technology for generating mesh data for 3D models is known. For example, Patent Literature (PTL) 1 discloses generating an analysis mesh based on dot sequential data expressed in (x,y,z) coordinates obtained by measuring the three-dimensional shape of an object to be analyzed.

CITATION LIST

Patent Literature

PTL 1: JP H06-301767 A

SUMMARY

There is room for improvement with respect to technology for generating mesh data for 3D models.

It would be helpful to improve technology for generating mesh data for 3D models.

A system according to an embodiment of the present disclosure is a system including a first information processing apparatus and a second information processing apparatus capable of communicating with each other,
wherein
the first information processing apparatus is configured to acquire three-dimensional point cloud data including multiple vertices each having three parameters of x-, y-, and z-coordinates and a combination of the x- and y-coordinates is different from vertex to vertex,
the first or second information processing apparatus is configured to convert the three-dimensional point cloud data into two-dimensional point cloud data in which each of the multiple vertices has two parameters of a parameter m with a different value for each combination of the x- and y-coordinates and the z-coordinate, and
the second information processing apparatus is configured to generate mesh data, using the two-dimensional point cloud data and information indicating correspondence between the combination of the x- and y-coordinates and the parameter m.

An information processing apparatus according to an embodiment of the present disclosure is an information processing apparatus including a controller configured to:
acquire two-dimensional point cloud data converted from three-dimensional point cloud data including multiple vertices each having three parameters of x-, y-, and z-coordinates, a combination of the x- and y-coordinates being different from vertex to vertex, each of the multiple vertices in the two-dimensional point cloud data having two parameters of a parameter m with a different value for each combination of the x- and y-coordinates and the z-coordinate; and
generate mesh data, using the two-dimensional point cloud data and information indicating correspondence between the combination of the x- and y-coordinates and the parameter m.

A method according to an embodiment of the present disclosure is a method performed by an information processing apparatus, the method including:
acquiring two-dimensional point cloud data converted from three-dimensional point cloud data including multiple vertices each having three parameters of x-, y-, and z-coordinates, a combination of the x- and y-coordinates being different from vertex to vertex, each of the multiple vertices in the two-dimensional point cloud data having two parameters of a parameter m with a different value for each combination of the x- and y-coordinates and the z-coordinate; and
generating mesh data, using the two-dimensional point cloud data and information indicating correspondence between the combination of the x- and y-coordinates and the parameter m.

According to an embodiment of the present disclosure, technology for generating mesh data for 3D models is improved.

DETAILED DESCRIPTION

Hereinafter, an embodiment of the present disclosure will be described.
(Outline of Embodiment)

Figure 1:
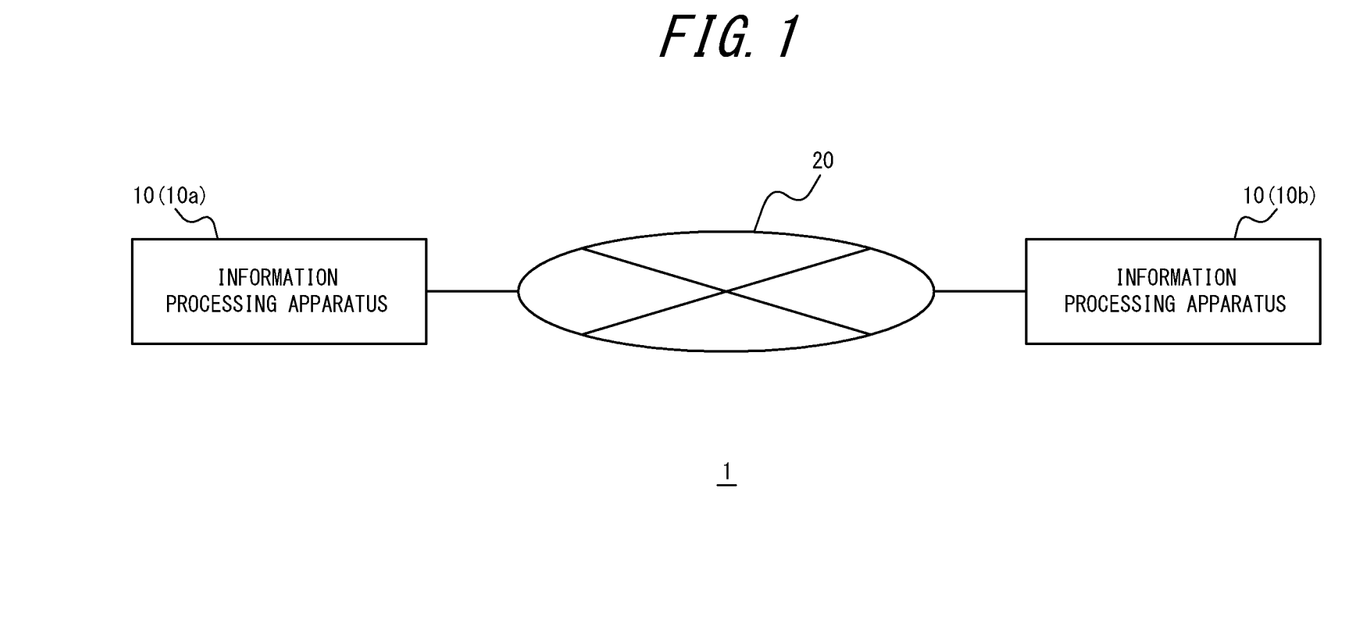
FIG. 1 is a block diagram illustrating a schematic configuration of a system according to an embodiment of the present disclosure.

An outline of a system 1 according to the embodiment of the present disclosure will be described with reference to FIG. 1. The system 1 includes a plurality of information processing apparatuses 10. Although two information processing apparatuses 10 (10a, 10b) are illustrated in FIG. 1, the system 1 may include three or more information processing apparatuses 10. In the following description, the two information processing apparatuses 10 (10a, 10b) are referred to as a first information processing apparatus 10a and a second information processing apparatus 10b, when distinguishing therebetween.

Each of the information processing apparatuses 10 is any computer used by a user, such as a personal computer (PC), a smartphone, or a tablet terminal, for example. The plurality of information processing apparatuses 10 can communicate with each other via a network 20 including the Internet or the like, for example. The information processing apparatuses 10 may communicate with each other via a server provided in the network 20 or by P2P.

Figure 2:
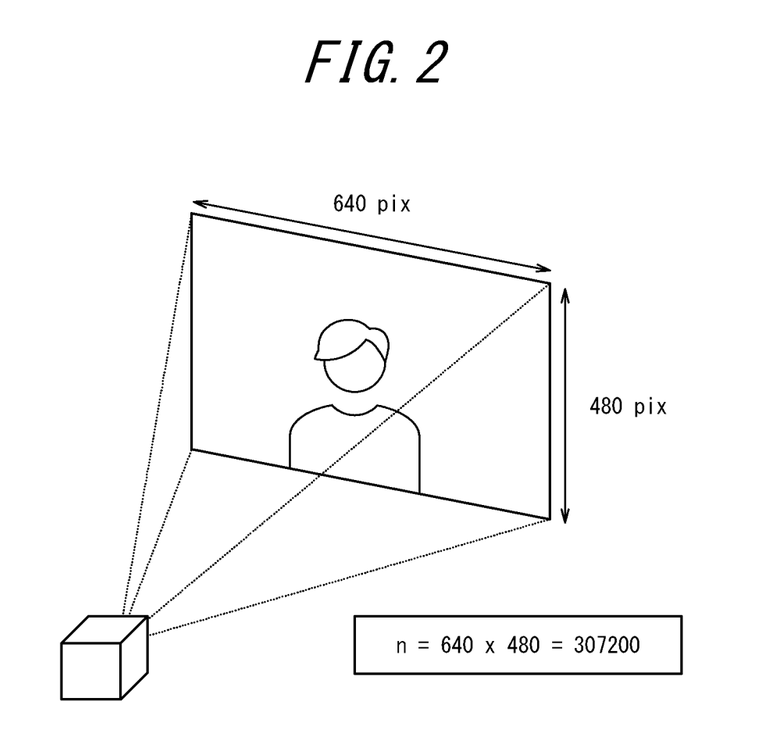
FIG. 2 is a drawing illustrating examples of a shooting range and resolution of a visible light camera and depth camera.

In the present embodiment, the system 1 is used to provide remote conversation service in which users of the information processing apparatuses 10 have a conversation with each other by audio while watching video of the conversation partner (the other user). Specifically, each of the information processing apparatuses 10 includes a visible light camera and a depth camera, as described below, which can image a subject and generate a visible light image and a depth image, respectively. In the visible light image, each pixel has an x-coordinate, a y-coordinate, and color information (for example, RGB values). In the depth image, on the other hand, each pixel has three parameters of an x-coordinate, a y-coordinate, and a z-coordinate. That is, data on the depth image is three-dimensional point cloud data including an N number of vertices P each having the three parameters of the x-, y-, and z-coordinates. In the present embodiment, for the sake of simplicity of explanation, as illustrated in FIG. 2, the visible light camera and the depth camera have substantially the same shooting range and resolution. The present disclosure will be described using an example in which the resolution of both the visible light image and the depth image to be generated is 640 pixels×480 pixels. In such a case, the number N of the vertices P constituting the three-dimensional point cloud data is N=640×480=307200.

Each information processing apparatus 10 can generate, from the three-dimensional point cloud data, mesh data corresponding to the shape of the user as a subject of the visible light camera and the depth camera, create a 3D model of the user by mapping the visible light image onto the mesh data, and display a rendering image, which is obtained by imaging the 3D model disposed in three-dimensional virtual space with a virtual camera, on a screen. During the remote conversation, each information processing apparatus 10 performs real-time rendering on the three-dimensional virtual space in which the 3D model of the conversation partner (i.e., the user of the other information processing apparatus 10) is disposed. In this way, during the remote conversation, the 3D model of the conversation partner displayed on the screen of each information processing apparatus 10 moves so as to follow the actual behavior of the conversation partner.

An outline of the present embodiment is described here, and details thereof will be described later. In the present embodiment, mesh data is generated using two-dimensional point cloud data converted from three-dimensional point cloud data.

Figure 3:
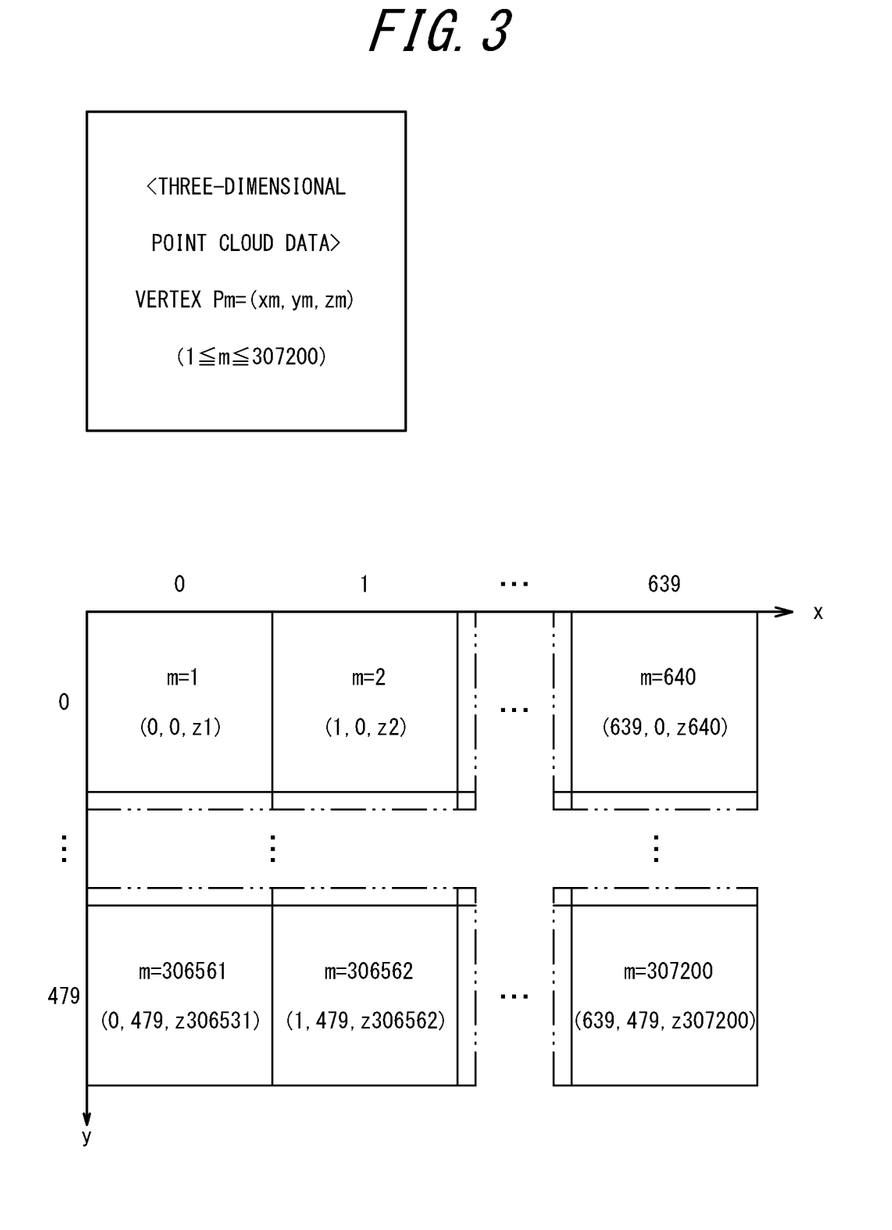
FIG. 3 is a drawing illustrating an example of three-dimensional point cloud data.

Specifically, the first information processing apparatus 10a acquires three-dimensional point cloud data including multiple vertices P. Here, as illustrated in FIG. 3, for example, each vertex P in the three-dimensional point cloud data has three parameters of x-, y-, and z-coordinates, and a combination of the x- and y-coordinates is different from vertex P to vertex P. In FIG. 3, a parameter m is a parameter with a different value for each combination of the x- and y-coordinates. Therefore, there is a one-to-one correspondence between the combination of the x- and y-coordinates and the parameter m. Once one is determined, the other is also uniquely determined. Therefore, in the three-dimensional point cloud data, each vertex P can be expressed as $Pm(xm,ym,zm)$ using the parameter m. For example, when the resolution of a depth image is 640 pixels×480 pixels, the parameter m can take values between 1 and 307200 inclusive ($1 \le m \le 307200$).

Figure 4:
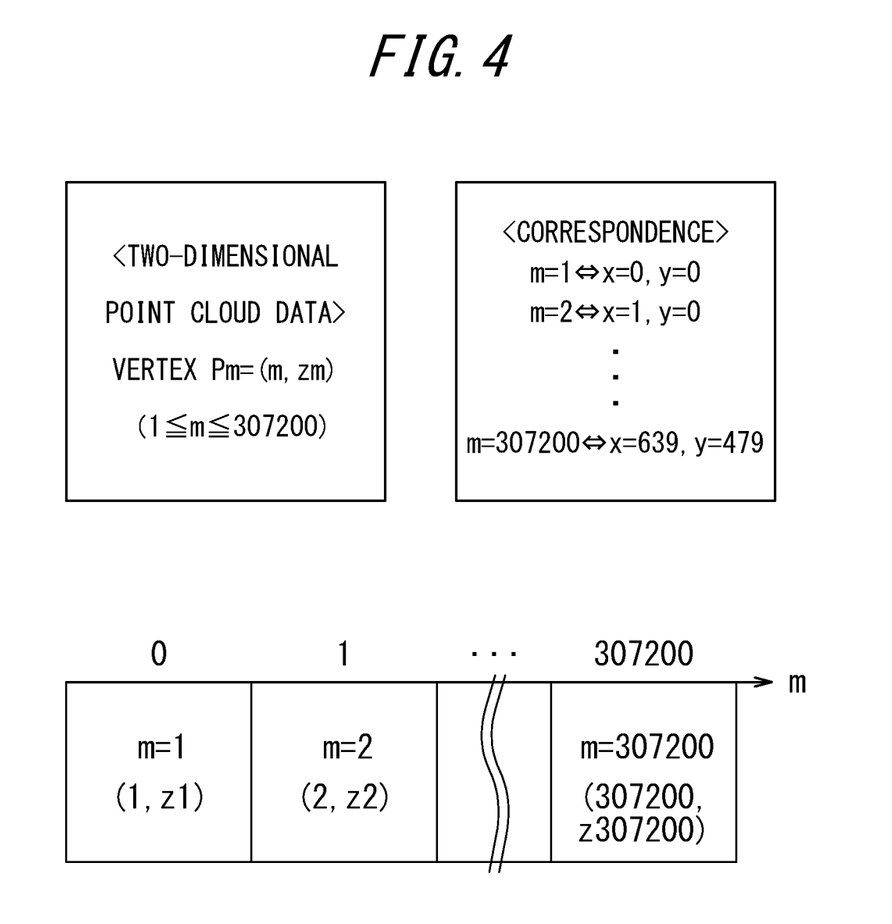
FIG. 4 is a drawing illustrating an example of two-dimensional point cloud data converted from the three-dimensional point cloud data.

Subsequently, the first or second information processing apparatus 10a or 10b converts the three-dimensional point cloud data into two-dimensional point cloud data. Here, as illustrated in FIG. 4, for example, each vertex P in the two-dimensional point cloud data has two parameters of the parameter m, which has a different value for each combination of the x- and y-coordinates, and the z-coordinate. Therefore, in the two-dimensional point cloud data, each vertex P can be expressed as $Pm(m,zm)$ using the parameter m.

The second information processing apparatus 10b then generates mesh data, using the two-dimensional point cloud data described above and information indicating correspondence between the combination of the x- and y-coordinates and the parameter m. Here, specific correspondence between a combination of x- and y-coordinates and a parameter can be arbitrarily determined. In the example illustrated in FIGS. 3 and 4, the information indicating the correspondence between the combination of the x- and y-coordinates and the parameter m indicates that m=1 corresponds to (0,0), m=2 to (1,0), and m=307200 to (639,479).

Thus, each vertex P included in the three-dimensional point cloud data according to the present embodiment has the three parameters of the x-, y-, and z-coordinates. Here, since the combination of the x- and y-coordinates is different from vertex P to vertex P, the three-dimensional point cloud data can be converted into the two-dimensional point cloud data in which each vertex P has the two parameters of the parameter m and the z-coordinate, by defining in advance the correspondence between the combination of the x- and y-coordinates and the parameter m. According to the present embodiment, the mesh data is generated using the two-dimensional point cloud data, so technology for generating mesh data for 3D models is improved in that mesh data generation processing is faster as compared to, for example, a configuration in which mesh data is generated using three-dimensional point cloud data.

Next, configurations of the system 1 will be described in detail.

(Configuration of Information Processing Apparatus)

Figure 5:
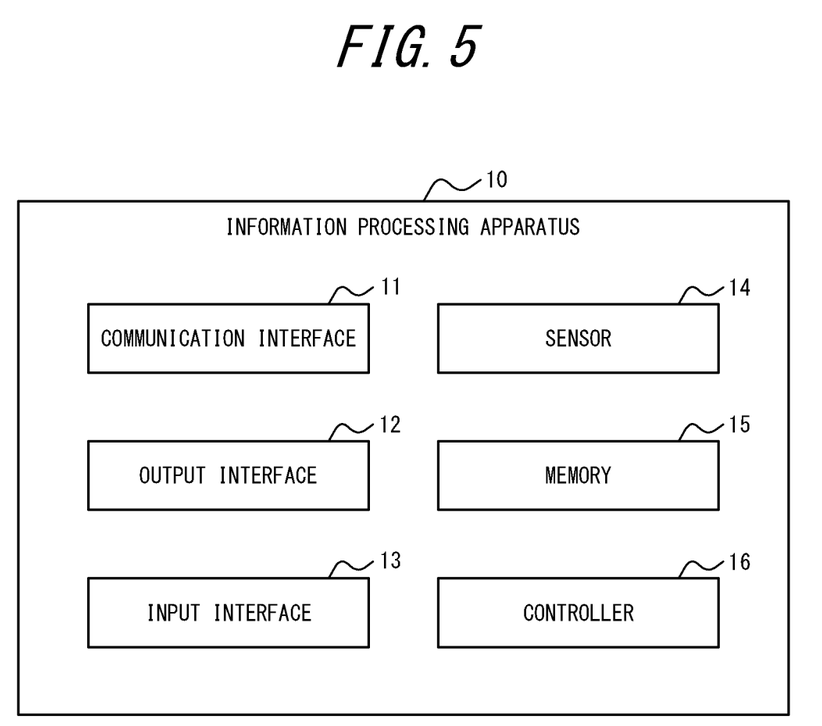
FIG. 5 is a block diagram illustrating a schematic configuration of an information processing apparatus.

As illustrated in FIG. 5, the information processing apparatus 10 includes a communication interface 11, an output interface 12, an input interface 13, a sensor 14, a memory 15, and a controller 16.

The communication interface 11 includes at least one interface for communication for connecting to the network 20. The communication interface is compliant with mobile communication standards such as the 4th generation (4G) or the 5th generation (5G), a wireless local area network (LAN), or a wired LAN, for example, but is not limited to these, and may be compliant with any communication standard.

The output interface 12 includes at least one output device for outputting information to notify a user of the information. The output device is a display for outputting information as video, a speaker for outputting information as audio, or the like, for example, but is not limited to these. Alternatively, the output interface 12 may include an interface for connecting to an external output device.

The input interface 13 includes at least one input device for detecting user input. The input device is a physical key, a capacitive key, a mouse, a touch panel, a touch screen integrally provided with a display of the output interface 12, a microphone, or the like, for example, but is not limited to these. Alternatively, the input interface 13 may include an interface for connecting to an external input device.

The sensor 14 includes at least one sensor. The sensor is a visible light camera for generating a visible light image, a depth camera for generating a depth image, or the like, for example, but is not limited to these. Alternatively, the sensor 14 may include an interface for connecting to an external sensor. For example, Kinect® (Kinect is a registered trademark in Japan, other countries, or both) with a visible light camera and a depth camera may be employed as the sensor 14.

In the present embodiment, the sensor 14 includes both a visible light camera and a depth camera. The visible light camera and the depth camera may be installed in close proximity to each other, for example, so as to have substantially the same shooting range. In the example illustrated in FIG. 2, the visible light camera and the depth camera can image a user in a defined position (for example, a position opposite a display of the output interface 12) from the front. Alternatively, the visible light camera and the depth camera may be installed so as to be capable of imaging the user in the defined position from different angles. In such a case, image processing for changing a viewpoint may be applied to a visible light image and/or a depth image, so as to form an image of the user from the front.

The memory 15 includes one or more memories. The memories are semiconductor memories, magnetic memories, optical memories, or the like, for example, but are not limited to these. The memories included in the memory 15 may each function as, for example, a main memory, an auxiliary memory, or a cache memory. The memory 15 stores any information to be used for operations of the information processing apparatus 10. For example, the memory 15 may store a system program, an application program, embedded software, and the like.

The controller 16 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 16 controls operations of the entire information processing apparatus 10.

(Flow of Operations of System)

Figure 6:
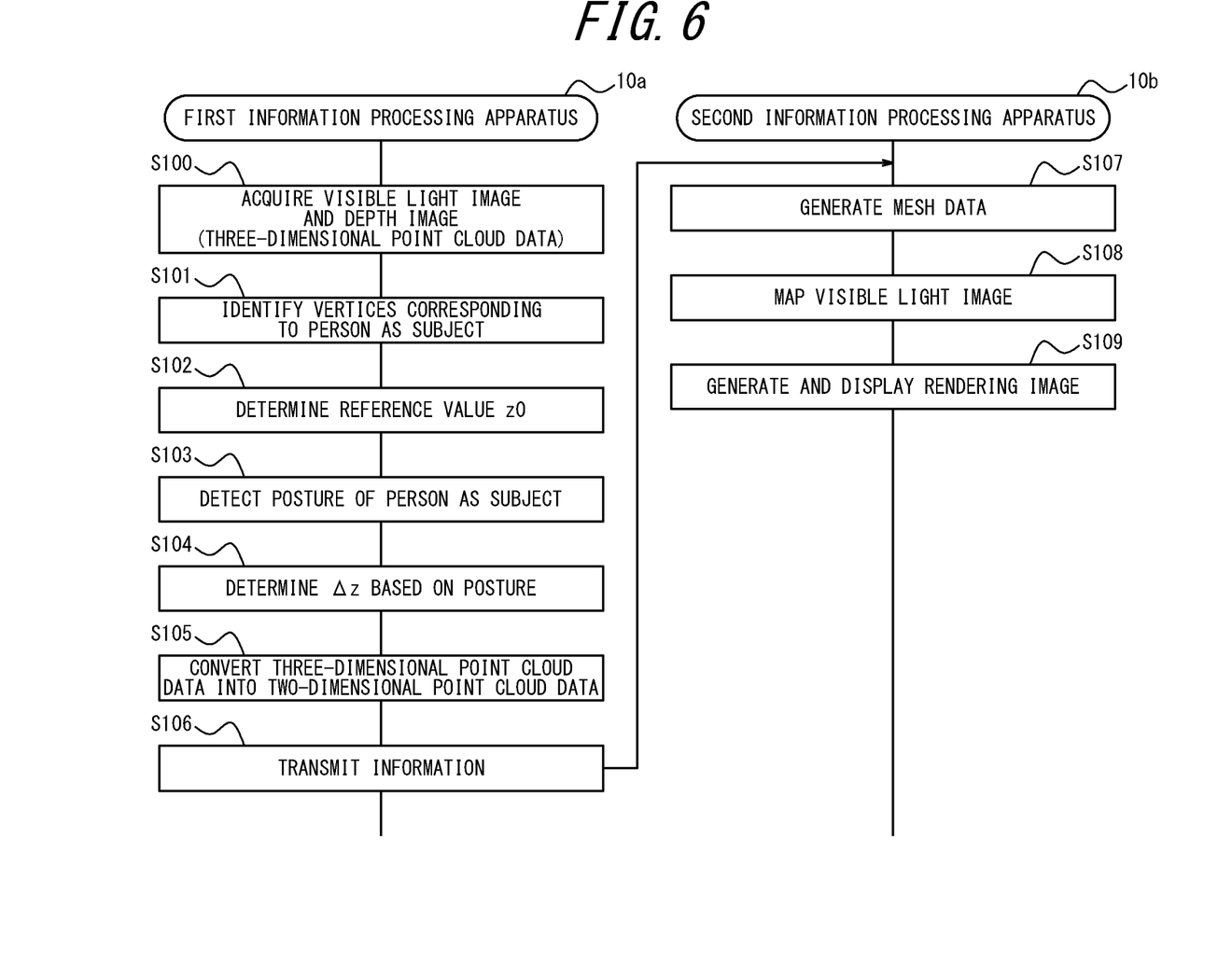
FIG. 6 is a sequence diagram illustrating an example of operations of the system.

Operations of the system 1 according to the present embodiment will be described with reference to FIG. 6. In outline, the operations are, among operations performed during remote conversation between a user A of the first information processing apparatus 10a and a user B of the second information processing apparatus 10b, operations in which the second information processing apparatus 10b generates and displays a rendering image of a 3D model of the user A. The operations are repeated during the remote conversation at a frame rate according to a predetermined or communication speed, for example.

Step S100: The first information processing apparatus 10a acquires a visible light image and a depth image of the user A.

Specifically, the controller 16a of the information processing apparatus 10a controls the visible light camera and the depth camera of the sensor 14a to image the user A, to acquire a visible light image and a depth image of the user A. Here, assuming that the visible light camera and the depth camera image the user A from the front who is present opposite a display of the output interface 12a. As illustrated in FIG. 2, assuming that the visible light camera and the depth camera have substantially the same shooting range, and the resolution of the acquired visible light image and depth image is 640 pixels×480 pixels. As described above, in the acquired visible light image, each pixel has an x-coordinate, a y-coordinate, and color information (for example, RGB values). On the other hand, as illustrated in FIG. 3, each vertex P included in the acquired depth image (three-dimensional point cloud data) is represented as a vertex $Pm(xm,ym,zm)$ using a parameter m with a different value for each combination of x- and y-coordinates.

The controller 16a may perform any preprocessing, such as noise removal and positioning, for example, on the acquired depth image (three-dimensional point cloud data).

Step S101: The first information processing apparatus 10a identifies vertices P corresponding to a person (here, user A) as a subject, from among all vertices P included in the depth image of step S100.

Any method can be employed to identify the vertices P corresponding to the person as the subject. For example, the controller 16a may identify, as the vertices P corresponding to the person, vertices P whose z-coordinates (i.e., distance from the depth camera) are within a predetermined range, from among all the vertices P included in the depth image. Alternatively, the controller 16a may detect a contour of the person from the visible light image and/or the depth image by image recognition, and identify vertices P located inside the detected contour as the vertices P corresponding to the person. In such a case, the controller 16a may identify vertices P for each part (for example, head, shoulders, trunk, arms, and the like) of the person. Any method, such as image recognition or skeletal detection using the visible light image and/or the depth image, can be employed to estimate each part of the person.

Here, the controller 16a may delete vertices P that do not correspond to the person (for example, vertices P corresponding to the person's background) from the depth image (three-dimensional point cloud data). In such a case, the depth image (three-dimensional point cloud data) includes only the vertices P corresponding to the person, so the number of vertices P included in the depth image (three-dimensional point cloud data) is less than N (here, 640×480=307200), resulting in reduced data volume.

Step S102: The first information processing apparatus 10a determines a reference value z0 based on the vertices P identified in step S101.

In outline, the reference value z0 is a representative value of the distance between the depth camera and the person (here, user A) as the subject. The reference value z0 is information used in step S107 to generate mesh data, and will be described in detail below.

Any method can be employed to determine the reference value z0. For example, the controller 16a may determine, as the reference value z0, the value of the z-coordinate of any one of the vertices P identified in step S101 as corresponding to the person as the subject. Here, the controller 16a may determine, as the reference value z0, the value of the z-coordinate of any one of the vertices P corresponding to the head, shoulders, or trunk of the person. Alternatively, the controller 16a may determine, as the reference value z0, a value (for example, an average value, a median value, or the like) calculated based on the z-coordinates of two or more vertices P of the identified vertices P. Here, the controller 16a may determine, as the reference value z0, a value calculated based on the z-coordinates of two or more vertices P corresponding to the head, shoulders, or trunk of the person.

Step S103: The first information processing apparatus 10a detects the posture of the person (here, user A) as the subject.

Any appropriate method can be employed to detect the posture of the person. For example, the controller 16a may detect the posture of the person by image recognition or skeletal detection using the visible light image and/or the depth image. In the present embodiment, the posture detected by the controller 16a is selected from among three postures of a forward leaning posture, a backward leaning posture, and an upright posture. In the forward leaning posture, the person's upper body is tilted forward. In the backward leaning posture, the person's upper body is tilted backward. In the upright posture, the person's upper body is not tilted either forward or backward. However, not limited to this example, the controller 16a may detect the posture in more detail. For example, the controller 16a may detect a tilt angle of the person's upper body in forward and backward directions, as the posture.

Step S104: The first information processing apparatus 10a determines Δz based on the posture detected in step S103.

In outline, Δz is a numerical value to define a distance range of z0±Δz in a z direction with respect to the reference value z0 described above. The distance range of z0±Δz is information used in step S107 to generate mesh data, and will be described in detail below.

Any method can be employed to determine Δz. For example, considering a situation in which the person as the subject outstretches a hand to block space between the head, shoulders, or trunk and the depth camera. For example, the controller 16a may set Δz to a predetermined value (for example, 30 cm) when the posture detected in step S103 is the upright posture, while set Δz to be larger when the posture detected in step S103 is the forward leaning posture or the backward leaning posture than when the upright posture. Alternatively, when the tilt angle of the person's upper body in the forward and backward directions is detected as the posture in step S103, the controller 16a may increase Δz as the absolute value of the tilt angle increases. In any method, by appropriately determining Δz according to the detected posture, it is possible to estimate, for example, that the head, shoulders, and trunk are within the range of z0±Δz, while the outstretched hand is outside the range of z0±Δz.

Step S105: The first information processing apparatus 10a converts the three-dimensional point cloud data into two-dimensional point cloud data.

Here, the two-dimensional point cloud data is point cloud data in which each vertex has two parameters of a parameter m, which has a different value for each combination of x- and y-coordinates, and a z-coordinate. As described above, each vertex P included in the three-dimensional point cloud data has three parameters of x-, y-, and z-coordinates, and a combination of the x- and y-coordinates is different from vertex P to vertex P. Therefore, as illustrated in FIG. 3, each vertex P included in the three-dimensional point cloud data can be expressed as a vertex Pm(xm,ym,zm) using the parameter m. On the other hand, each vertex P included in the two-dimensional point cloud data has the two parameters of the parameter m and the z coordinate. Therefore, as illustrated in FIG. 4, each vertex P included in the two-dimensional point cloud data can be expressed as a vertex Pm(m,zm).

In the example illustrated in FIGS. 3 and 4, correspondence between the combination of the x- and y-coordinates and the parameter m is defined such that m=1 corresponds to (x=0, y=0), m=2 corresponds to (x=1, y=0), and m=307200 corresponds to (x=639, y=479). However, the correspondence between the combination of the x- and y-coordinates and the parameter m is not limited to this example, but can be defined arbitrarily. Information indicating the correspondence between the combination of the x- and y-coordinates and the parameter m may, for example, be stored in the memory 15a in advance.

Thus, in step S105, data on each vertex Pm is converted from three-dimensional data with the three parameters of the x-, y-, and z-coordinates into two-dimensional data with the two parameters of the parameter m and the z-coordinate.

Step S106: The first information processing apparatus 10a transmits, to the second information processing apparatus 10b, any information used for generating a 3D model of the person (here, user A) as the subject.

In the present embodiment, the controller 16a controls the communication interface 11a to transmit, to the second information processing apparatus 10b via the network 20, the visible light image acquired in step S100, the reference value z0 determined in step S102, Δz determined in step S104, the two-dimensional point cloud data generated in step S105, and information indicating the correspondence between the combination of the x- and y-coordinates and the parameter m. In a case in which the vertices P that do not correspond to the person are not deleted from the depth image (three-dimensional point cloud data) in step S101, the controller 16a may control the communication interface 11a to transmit information indicating the vertices P identified in step S101 as corresponding to the person as the subject (for example, parameters m corresponding to the identified vertices P), to the second information processing apparatus 10b.

Step S107: The second information processing apparatus 10b generates mesh data for the person (here, user A) as the subject, using the two-dimensional point cloud data and the information indicating the correspondence between the combination of the x- and y-coordinates and the parameter m.

As described above, in the present embodiment, since the combination of the x- and y-coordinates is different from vertex P to vertex P, it is possible to convert the three-dimensional point cloud data into the two-dimensional point cloud data in which each vertex P has the two parameters of the parameter m and the z-coordinate, by defining in advance the correspondence between the combination of the x- and y-coordinates and the parameter m. According to the present embodiment, the mesh data is generated using the two-dimensional point cloud data, so mesh data generation processing is faster as compared to, for example, a configuration in which mesh data is generated using three-dimensional point cloud data.

Any algorithm, such as the Delaunay method or the advancing front method, can be employed to generate the mesh data. Specifically, the controller 16b of the second information processing apparatus 10b forms, for each two vertices P identified according to the algorithm employed, edges each connecting the two vertices P of the multiple vertices P included in the two-dimensional point cloud data. The controller 16b forms minute planes, each surrounded by a predetermined number of edges, with polygons. Typically, each polygon to be formed is a triangular polygon that includes three vertices and three edges connecting the three vertices, but the shape of the polygon is not limited to this example. In this way, the controller 16b generates a set of vertices P, edges, and polygons, as the mesh data.

When generating the mesh data, in a case in which the z-coordinate of one of the two vertices P is within the range of $z0\pm\Delta z$ and the z-coordinate of the other vertex P is outside the range of $z0\pm\Delta z$, the controller 16a may not form a polygon having the two vertices P. According to such a configuration, for example, when the person (here, user A) as the subject outstretches a hand to block space between the head, shoulders, or trunk and the depth camera, it is possible to reduce the occurrence of a problem that a polygon is formed between the head, shoulders, or trunk and the hand. Explanation is provided below with reference to FIG. 7.

Figure 7:
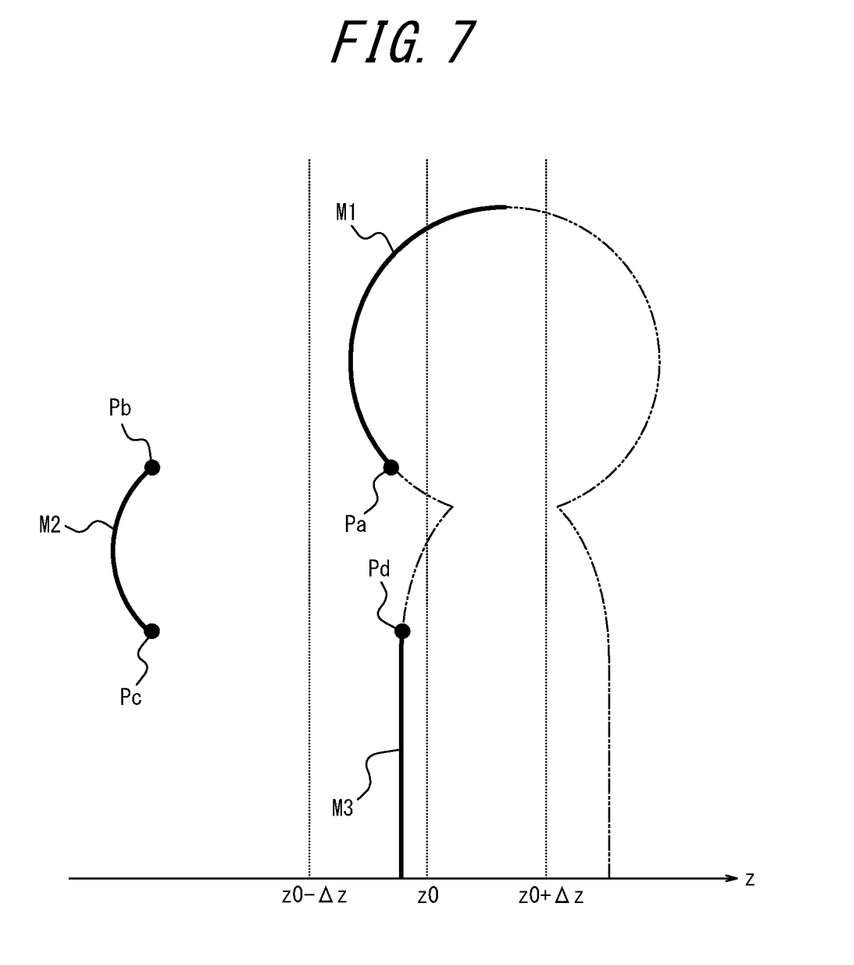
FIG. 7 is a schematic diagram illustrating a cross-section of generated mesh data along a y-z plane.

FIG. 7 is a schematic diagram illustrating a cross-section of the generated mesh data along a y-z plane. A mesh M1 corresponds to the head (face), a mesh M2 corresponds to the outstretched hand, and a mesh M3 corresponds to the trunk. As described above, in the present embodiment, the depth camera of the first information processing apparatus 10a images the user A from the front, so a mesh corresponding thereto is not formed for a part (specifically, a back part and a part blocked by the outstretched hand) of the body of the user A. However, for simplicity of explanation, the part of the body of the user A whose mesh is not formed is illustrated with chain double-dashed lines.

Focusing attention on a vertex Pa located at a bottom end of the mesh M1, and a vertex Pb located at a top end of the mesh M2. The vertices Pa and Pb are adjacent in a y direction. The z-coordinate of the vertex Pa is within the range of $z0\pm\Delta z$. On the other hand, the z-coordinate of the vertex Pb is outside the range of $z0\pm\Delta z$. Therefore, a polygon including the vertices Pa and Pb is not formed, so the occurrence of a problem that, for example, the mesh M1 corresponding to the head and the mesh M2 corresponding to the outstretched hand are unnaturally connected is reduced. The same is true for a vertex Pc located at a bottom end of the mesh M2 and a vertex Pd located at a top end of the mesh M3. The vertices Pc and Pd are adjacent in the y direction. The z-coordinate of the vertex Pc is outside the range of $z0\pm\Delta z$. On the other hand, the z-coordinate of the vertex Pd is within the range of $z0\pm\Delta z$. Therefore, since a polygon including the vertices Pc and Pd is not formed, the occurrence of a problem that, for example, the mesh M2 corresponding to the outstretched hand and the mesh M3 corresponding to the trunk are unnaturally connected is reduced.

Step S108: The second information processing apparatus 10b maps the visible light image onto the mesh data generated in step S107, to create a 3D model of the person (here, user A) as the subject.

As described above, in the present embodiment, the visible light camera and the depth camera of the first information processing apparatus 10a have substantially the same shooting range and resolution. Therefore, each pixel in the visible light image has one-to-one correspondence with each vertex P in the depth image (three-dimensional point cloud data). The controller 16b maps a region corresponding to the user A in the visible light image to the mesh data, based on the correspondence. The 3D model of the user A is thereby created.

Step S109: The second information processing apparatus 10b generates and displays a rendering image of the 3D model created in step S108.

Specifically, the controller 16b disposes the 3D model of the person (here, user A) as the subject in three-dimensional virtual space. The controller 16b generates a rendering image by capturing the 3D model disposed in the three-dimensional virtual space with a virtual camera, and displays the rendering image on a display of the output interface 12b. The position of the virtual camera in the three-dimensional virtual space may be predetermined, or may be linked to the position of the user B of the second information processing apparatus 10b in real space.

As described above, in the system 1 according to the present embodiment, the first information processing apparatus 10a acquires the three-dimensional point cloud data including the multiple vertices P. In the three-dimensional point cloud data, each vertex P has the three parameters of the x-, y-, and z-coordinates, and the combination of the x- and y-coordinates is different from vertex P to vertex P. The first information processing apparatus 10a converts the three-dimensional point cloud data into the two-dimensional point cloud data.

In the two-dimensional point cloud data, each of the multiple vertices P has the two parameters of the parameter m, which has a different value for each combination of the x- and y-coordinates, and the z-coordinate. The second information processing apparatus 10b then generates the mesh data using the two-dimensional point cloud data and the information indicating the correspondence between the combination of the x- and y-coordinates and the parameter m.

According to such a configuration, since the combination of the x- and y-coordinates is different from vertex P to vertex P, it is possible to convert the three-dimensional point cloud data into the two-dimensional point cloud data in which each vertex P has the two parameters of the parameter m and the z-coordinate, by defining in advance the correspondence between the combination of the x- and y-coordinates and the parameter m. According to the present embodiment, the mesh data is generated using the two-dimensional point cloud data, so technology for generating mesh data for 3D models is improved in that mesh data generation processing is faster as compared to, for example, a configuration in which mesh data is generated using three-dimensional point cloud data.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which a part of the operations performed by the first information processing apparatus 10a in the embodiment described above is performed by the second information processing apparatus 10b can be implemented. For example, the operations of steps S101 to S105 described above may be performed by the second information processing apparatus 10b. In such a case, the first information processing apparatus 10a transmits the visible light image and the depth image (three-dimensional point cloud data) acquired in step S100 to the second information processing apparatus 10b, and the second information processing apparatus 10b performs the operations of steps S101 to S105. In other words, the operations of steps S101 to S105 should be performed by either the first information processing apparatus 10a or the second information processing apparatus 10b.

In the embodiment described above, when generating the mesh data, the second information processing apparatus 10b may adjust the resolution of the generated mesh data according to the distance (i.e., z-coordinate) between the depth camera of the first information processing apparatus 10a and the person (here, user A) as the subject. The resolution of the mesh data can be reduced by any method, for example, by thinning out some of the vertices P included in the two-dimensional point cloud data. The reduction in the resolution of the mesh data reduces a processing load for generation of the mesh data, rendering, and the like. For example, the controller 16b of the second information processing apparatus 10b may reduce the resolution, the farther the distance between the depth camera and the user A (i.e., the larger the z coordinate). When the user A is far away from the depth camera, it is difficult to accurately represent details, such as facial expressions of the user A, for example, in the 3D model. Accordingly, intentionally reducing the resolution of the generated mesh data has little negative effect on visibility of the screen. Alternatively, the controller 16b may reduce the resolution, the closer the distance between the depth camera and the user A (i.e., the smaller the z coordinate). According to such a configuration, it is possible, during the remote conversation, for example, to control variation in fineness of 3D data on the user A, according to variation in the distance between the depth camera and the user A.

In the embodiment described above, when generating the mesh data, the second information processing apparatus 10b may adjust the resolution of the generated mesh data for each part of the person (here, user A) as the subject. For example, the controller 16b of the second information processing apparatus 10b may reduce the resolution of the mesh data corresponding to parts (for example, shoulders, trunk, arms, and the like) other than the head of the user A. According to this configuration, a processing load for generation of the mesh data, rendering, and the like can be reduced, while maintaining a certain level of accuracy in reproducing facial expressions, which are relatively important elements in the remote communication.

In the embodiment described above, a person is employed as a specific example of a subject, but any object other than a person may be employed as a subject.

For example, an embodiment in which a general purpose computer functions as the information processing apparatus 10 according to the above embodiment can also be implemented. Specifically, a program in which processes for realizing the functions of the information processing apparatus 10 according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. A system comprising a first information processing apparatus and a second information processing apparatus capable of communicating with each other,
   wherein
   the first information processing apparatus comprises a first controller configured to: acquire three-dimensional point cloud data including multiple vertices each having three parameters of x-, y-, and z-coordinates and a combination of the x- and y-coordinates is different from vertex to vertex,
   and convert the three-dimensional point cloud data into two-dimensional point cloud data in which each of the multiple vertices has two parameters, a parameter m with a different value for each combination of the x- and y-coordinates, and the z-coordinate,
   and the second information processing apparatus comprises a second controller configured to:
   generate mesh data, using the two-dimensional point cloud data and information indicating correspondence between the combination of the x- and y-coordinates and the parameter m, and
   wherein when generating the mesh data, the second controller is configured to not form a polygon including two vertices, in a case in which the z-coordinate of one of the two vertices is within a range of a reference value z0+Δz, and the z-coordinate of the other of the two vertices is outside the range of the reference value z0+Δz.

2. The system according to claim 1, wherein the three-dimensional point cloud data is data on a depth image of a person captured by a depth camera, and the first controller or second controller is configured to:
   identify respective vertices corresponding to the person, of all vertices included in the depth image, as the multiple vertices; and
   determine, as the reference value z0, a value of the z-coordinate of any one of the multiple vertices or a value calculated based on the z-coordinates of two or more vertices of the multiple vertices.

3. The system according to claim 2, wherein the first controller or second controller is configured to:
   detect a posture of the person; and
   determine Δz, based on the posture of the person.

4. The system according to claim 2, wherein when generating the mesh data, the second controller is configured to adjust a resolution of the mesh data to be generated, according to a distance between the depth camera and the person.

5. The system according to claim 2, wherein when generating the mesh data, the second information controller is configured to adjust a resolution of the mesh data to be generated for each part of the person.

6. An information processing apparatus comprising a controller configured to:
   acquire two-dimensional point cloud data converted from three-dimensional point cloud data including multiple vertices each having three parameters of x-, y-, and z-coordinates, a combination of the x- and y-coordinates being different from vertex to vertex, each of the multiple vertices in the two-dimensional point cloud data having two parameters of a parameter m with a different value for each combination of the x- and y-coordinates and the z-coordinate; and
   generate mesh data, using the two-dimensional point cloud data and information indicating correspondence between the combination of the x- and y-coordinates and the parameter m,
   wherein when generating the mesh data, the controller is configured to not form a polygon including two vertices, in a case in which the z-coordinate of one of the two vertices is within a range of a reference value z0+Δz, and the z-coordinate of the other of the two vertices is outside the range of the reference value z0+Δz.

7. A method performed by an information processing apparatus, the method comprising:
   acquiring two-dimensional point cloud data converted from three-dimensional point cloud data including multiple vertices each having three parameters of x-, y-, and z-coordinates, a combination of the x- and y-coordinates being different from vertex to vertex, each of the multiple vertices in the two-dimensional point cloud data having two parameters of a parameter m with a different value for each combination of the x- and y-coordinates and the z-coordinate; and generating mesh data, using the two-dimensional point cloud data and information indicating correspondence between the combination of the x- and y-coordinates and the parameter m, wherein when generating the mesh data, a polygon including two vertices is not formed, in a case in which the z-coordinate of one of the two vertices is within a range of a reference value $z0+\Delta z$, and the z-coordinate of the other of the two vertices is outside the range of the reference value $z0+\Delta z$.

* * * * *